United States Patent [19]

Ito

[11] 3,861,812
[45] Jan. 21, 1975

[54] BALL JOINT
[75] Inventor: Isao Ito, Handa, Japan
[73] Assignee: Nippondenso Co., Ltd., Kariya-shi, Aichi-ken, Japan
[22] Filed: July 19, 1972
[21] Appl. No.: 273,127

[30] Foreign Application Priority Data
July 26, 1971 Japan.......................... 46-66228[U]

[52] U.S. Cl................................... 403/71, 403/141
[51] Int. Cl. ............................................ F16c 11/06
[58] Field of Search................ 287/90 R, 87, 21, 93; 16/2; 403/56, 71, 76, 141, 142, 133, 122

[56] References Cited
UNITED STATES PATENTS

| | | | |
|---|---|---|---|
| 3,001,007 | 9/1961 | Klumpp, Jr. et al.................. | 16/2 X |
| 3,378,284 | 4/1968 | Blanchard, Jr..................... | 287/87 X |
| 3,704,903 | 12/1972 | Ito..................................... | 287/90 R |

Primary Examiner—Andrew V. Kundrat
Attorney, Agent, or Firm—Cushman, Darby & Cushman

[57] ABSTRACT

An improvement in the ball joint for drivingly connecting link members of a windshield wiper apparatus. The improved ball joint has a plastic socket provided with a plurality of arms extending radially outwardly therefrom and terminating in ends which are in engagement with a first link member on which the socket is mounted. The socket is formed therein with a spherical recess receiving a ball mounted on a second link member. The lower peripheral wall portion of the socket is received in an opening in the first link member in such a manner that the lower wall portion of the socket is radially supported by the peripheral inner surface defining the opening and restrained by the peripheral inner surface from being expanded beyond a diameter equal to the largest diameter of the ball to prevent the removal of the ball from the socket.

5 Claims, 11 Drawing Figures

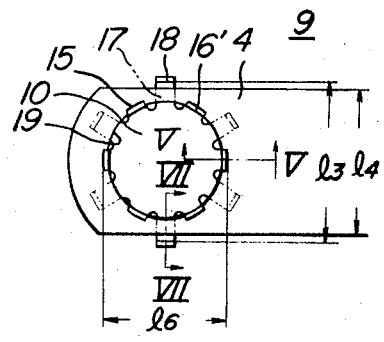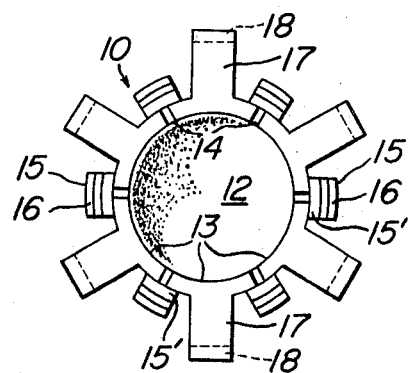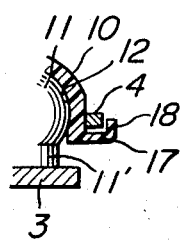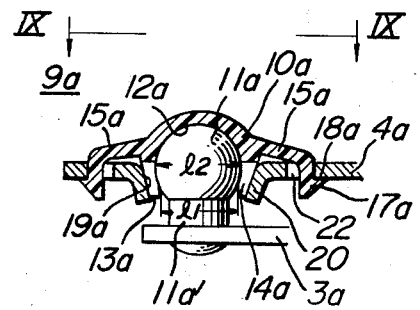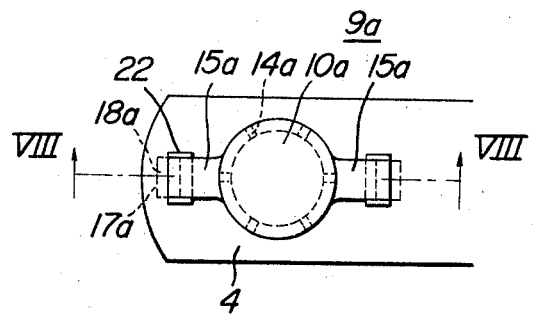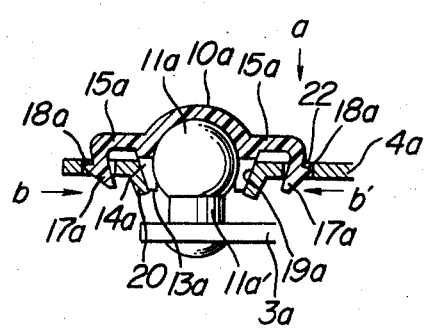

BALL JOINT

BACKGROUND OF THE INVENTION

1. Field of the Invention

The present invention relates to an improvement in a ball joint which can be used, but not restrictively, to drivingly connect link members of a windshield wiper apparatus together.

2. Description of Prior Art

Japanese Utility Model Publication No. 2207/63 discloses a ball joint of the kind concerned. The ball joint includes a socket of a plastic material which is moulded in a mould cavity and simultaneously fused to a part of a link member which is disposed to extend into the mould cavity. The socket has a lower peripheral wall portion extending below the link member and formed therein with a plurality of notches which allow the lower peripheral wall portion to be expanded to a diameter larger than the largest diameter of the ball so as to permit the insertion of the ball into a recess formed in the socket. While the ball joint has advantages in that the socket is of a simplified construction, the socket design facilitates easy assembly of the socket and the ball and, moreover, the ball joint can be manufactured economically, the ball joint has an inherent disadvantage that the ball is readily removed from the socket during operation. This is particularly important when the ball joint is used to drivingly connect link members of a windshield wiper apparatus of a vehicle in which a force tending to separate the ball and the socket apart is produced due to the fact that the wiper blades are moved across curved windshield.

Japanese Patent Publication No. 9105/62 discloses an improved ball joint for a similar purpose. The improvement comprises an opening defined by the upper peripheral edge of a spherical annular surface in the socket in which a ball is received. The ball has an upper stem portion and a radially enlarged head on the top of the stem portion. The latter and the head extend upwardly above the top surface of the socket. The head is designed to restrain the ball from being removed from the socket. The ball has relatively complicated construction as discussed. In addition, because of the described arrangement of the ball joint, the same is not sealed against water and foreign materials such as sand particles which tend to enter into an annular gap between the socket and the ball. The water disadvantageously washes away the grease filling up the gap. The sand particles also disadvantageously affect the relative sliding surfaces of the ball and the socket.

SUMMARY OF THE INVENTION

It is a principal object of the present invention to provide an improved ball joint which is free from the disadvantages of the prior art above-discussed.

It is another object of the present invention to provide a ball joint which can be economically manufactured.

It is a further object of the present invention to provide a ball joint which is sealed from water and foreign materials such as sand particles.

It is a further object of the present invention to provide a ball joint in which the ball and the socket assembled therewith are prevented from being separated apart during operation.

It is a still further object of the present invention to provide a ball joint of a design which allows a plurality of sockets to be moulded simultaneously and does not require simultaneous moulding and fusion of a socket onto a link member within a mold cavity.

The invention relates generally to a ball joint wherein, there is provided a ball joint including a coupling ball, a first member on which said ball is mounted, a socket having a body formed therein with a recess which rotatably receives said ball, and a second member on which said socket is mounted, wherein said socket is provided with resiliently deformable arms which secure said socket to said second member by virtue of the resilient deformation of said arms, said second member being formed therein with an opening in which said socket is received at its portion adjacent the peripheral edge of the opening of said recess in said socket, the arrangement being such that said peripheral edge is restrained by the peripheral edge of said opening in said second member from being expanded beyond a diameter equal to the largest diameter of said ball.

According to a preferred embodiment of the invention, the socket may be made of a plastic material. The arms may comprise a plurality of upper and lower arms extending generally radially outwardly from the body of said socket. The upper and lower arms may advantageously have their outer ends which are resiliently urged into contact with the top and bottom surfaces of said second member to hold the socket against the removal thereof from the second member. At least a pair of diametrically opposed lower arms may advantageously have their outer ends in locking engagement with the side edges of the second member to hold the socket against rotation thereof with respect to the second member. The upper arms are advantageously spaced radially outwardly from the peripheral edge of the opening of the recess in the body of the socket to cooperate with the last-mentioned peripheral edge to define therebetween a plurality of circumferentially discontinuous spaces which allow the upper arms to be radially outwardly deformed against the resiliency of the arms when the socket is fitted into the opening in the second member. Each of the upper arms advantageously has its upper surface radially outwardly and downwardly inclined so that the upper surface serves as a cam surface which guides and centers the socket with respect to the opening in the second member when the socket and the second member are assembled together. Each of the upper arms also has a lower surface substantially parallel with the axis of the socket and being radially inwardly offset from the outermost end of the inclined upper surface of the upper arm to define therebetween a shoulder. The lower surface and the shoulder of each upper arm of the socket are resilliently urged against the peripheral edge portion of the opening in the second member.

According to another preferred embodiment of the invention, the socket is designed to be mounted on a second member which is formed therein with apertures adjacent the opening therein for receiving the lower peripheral wall portion of the socket. The opening in the second member may advantageously be defined by a downwardly tapered inner peripheral surface of an annular flange formed on the second member. The flange is operative to radially support the peripheral lower wall portion of the socket against expansion during operation. The arms may advantageously have their outer ends downwardly turned to extend through the apertures in the second member. Shoulders may preferably be formed on the downwardly turned ends of the arms so that the shoulders are urged by the resiliency of the arms into engagement with the bottom surfaces of the second member adjacent the peripheral edges of the apertures therein to hold the socket against removal from the second member and against rotation of the socket with respect to the second member.

The above and other objects, features and advantages of the present invention will be made more apparent from the following description of preferred embodiments of the invention with reference to the accompanying drawings.

DESCRIPTION OF THE DRAWINGS

FIG. 6A is a top plan view of the ball joint shown in FIG. 5 taken along line VIA—VIA in FIG. 5;

FIG. 6B is an enlarged bottom view of the socket of the ball joint shown in FIGS. 5 and 6A;

FIG. 7 is an enlarged fragmentary sectional view of the ball joint shown in FIGS. 5 and 6A taken along line VII—VII in FIG. 6A;

FIG. 8 is an enlarged sectional view of another embodiment of the ball joint according to the present invention taken along line VIII—VIII in FIG. 9;

FIG. 9 is a top plan view of the ball joint taken along line IX—IX in FIG. 8; and FIG. 10 illustrates in sectional side elevation the members of the ball joint shown in FIGS. 8 and 9 when the members are being assembled.

DESCRIPTION OF PREFERRED EMBODIMENTS

Figure 1:
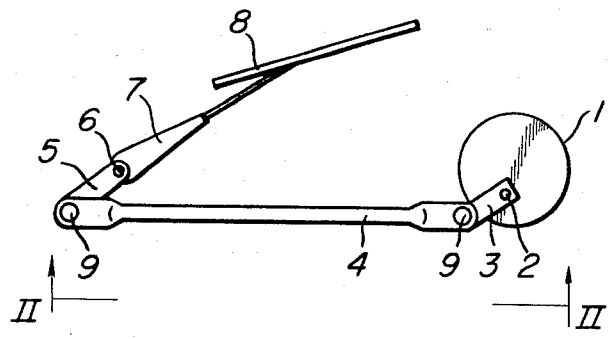
FIG. 1 is a schematic front view of a windshield wiper apparatus which utilizes the ball joints according to the present invention.
Figure 2:
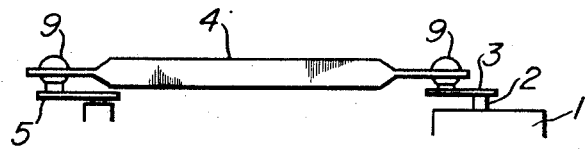
FIG. 2 is a side elevational view of the wiper apparatus shown in FIG. 1.

Referring to FIGS. 1 and 2 of the drawings, there is shown a windshield wiper apparatus having a wiper motor 1 which drives a shaft 2 on which is mounted a crank arm 3 which in turn is drivingly connected to one end of a link member 4 by means of a ball joint 9 of the present invention to be described later in detail. The link member 4 has its other end drivingly connected to one end of a link lever 5 by means of another ball joint 9 of the present invention. These elements cooperate to form a link mechanism which is operable to transform the rotation of the motor 1 into an oscillation which in turn is transmitted to a shaft 6 to which a wiper arm 7 is fixed for the oscillating about shaft 6. A wiper blade 8 connected to arm 7 is adapted to wipe a windshield of an automobile, not shown.

Figure 3:
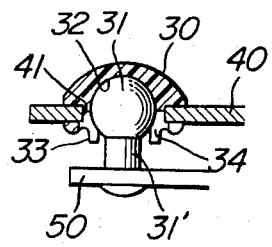
FIGS. 3 and 4 are enlarged sectional side views of prior art ball joints used to couple link members of windshield wiper apparatuses.

Before describing the ball joints of the present invention in detail, the prior art ball joint will be discussed in more detail with reference to FIGS. 3 and 4 of the drawings. The ball joint shown in FIG. 3 is disclosed in the Japanese Utility Model Publication No. 2207/63 and has a socket 30 of a plastic material. The socket 30 is moulded in such a manner that a link member 40 is so disposed as to partly extend into a mould cavity in which the plastic material is moulded and is fused to the link member 40. The socket 30 has a spherical recess or inner surface 32 which is so shaped as to snugly but rotatably receive a coupling ball 31 having a stem portion 31' secured to a crank arm 50. The recess 32 has an opening 33 defined by an annular peripheral edge of the recess in which notches 34 are formed to facilitate the insertion of the ball 31 into the recess 32.

The described prior art ball joint has advantages that the ball joint has a simplified construction, the coupling ball 31 and the socket 30 can be economically manufactured and easily assembled with the coupling ball 31 or disassembled therefrom. This prior art ball joint, however, has a drawback because the socket 30 and the coupling ball 31 are apt to be accidentally disconnected from one another during operation because the curvature of the windshield does not allow the opposite ends of the link member 4 to be oscillated in the same plane. This causes the ends of the link member 4 to be moved in various planes which are angularly displaced or offset with respect to the planes in which the crank arm and the link lever are oscillated, with a resultant disadvantage that at the ends of the link member 4 there is produced a force which tends to move each end of the link member 4 away from the cooperating crank arm 3 or the link lever 5.

Figure 4:
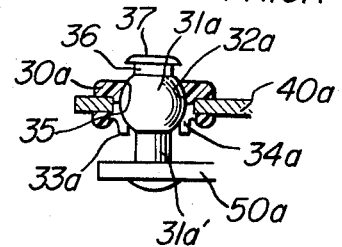

An example of the ball joints which have been designed to eliminate the afore-described difficulty is disclosed in the Japanese Patent Publication No. 9105/62 and shown in FIG. 4 of the drawings. This ball joint includes a ball portion 31a having a stem portion 31a' secured to an oscillatory member 50a. The ball portion also has another stem portion 36 which is connected to the upper part of the ball portion and which is provided with a radially enlarged head 37. The ball portion 31a is snugly but rotatably received in a socket 30a of a plastic material which is fused to a link member 40a as in the ball joint shown in FIG. 3. The socket 30a, however, has a flattened top in which is formed an opening 35 which is defined by the upper peripheral edge of an annular spherical inner surface 32a in the socket 30a and through which the upper part of the ball 31a extends upwardly. The socket 30a also has an opening defined by an annular peripheral lower edge 33a of the annular surface 32a in which notches 34a are formed for the same purpose as the notches 34 in FIG. 3. The head 37 is intended to be engaged with the peripheral edge of the opening 35 in the socket 30a to prevent the ball from being disengaged or removed from the socket 30a in the event that, for the reason described in connection with the ball joint shown in FIG. 3, a force is produced which tends to disconnect the ball 31a and the socket 30a from one another.

The prior art ball joint shown in FIG. 4 has an inherent disadvantage in that the ball 31a has a complicated configuration, as shown in FIG. 4, which makes it difficult to manufacture the ball. Another disadvantage of the ball joint shown in FIG. 4 is that, in the case where the ball joint is disposed at a location where water is poured to the ball joint, the water washes away or removes the lubricant, such as grease, which is applied to the relative sliding surfaces of the ball 31a and the socket 30a so as to minimize the friction between these members for the most efficient transmission of the drive force from the wiper motor to the wiper arm. The removal of the grease causes increases in the coefficient of friction, in the wear of the relative sliding surfaces and in the loss of drive force. In addition, in the case where the ball joint is disposed at a dusty place, foreign materials such as sand particles enter the annular gap between the relative sliding surfaces of the socket 30a and the ball 31a to scratch these surfaces. Thus, the coefficient of friction between these surfaces is increased to greatly increase the wear of these surfaces and the loss of the drive force to be transmitted.

Heretofore, the motor and the link mechanism of a windshield wiper apparatus were disposed within an operator's compartment. Recent automobile design disposes the wiper motor and link mechanisms within an engine compartment partly for the purpose of shielding the noise of the motor and link mechanism from the operator and passenger and partly because it is difficult to obtain a space for the wiper motor and link mechanism within the operator's compartment.

Under the circumstances, the fact that water and sand particles detrimentally affect the operation and function of ball joints is a serious problem. Thus, caps of resilient and water impermeable material, such as rubber, are applied to the ball joints so as to seal the same from water and foreign materials. The use of the caps not only involves an additional cost of manufacture of the caps but also requires extremely complicated and difficult assembly of the mechanical members, which results in a substantially increased cost of manufacture of ball joints.

Moreover, the moulding of the sockets 30 and 30a of the prior art ball joints requires simultaneous bonding or fusion of the moulded sockets onto the link members. In order to satisfy this requirement, the link members must be so positioned with respect to moulds as to partly extend into mould cavities. This causes the moulding operation to be performed at an extremely lowered or reduced efficiency.

Figure 5:
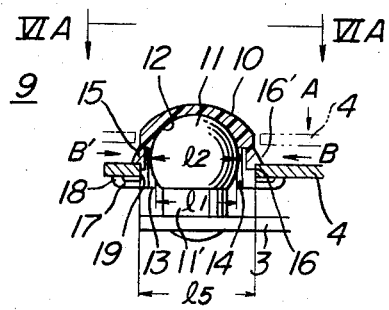
FIG. 5 is a similar view but illustrating an embodiment of the ball joint according to the present invention.

Referring now to FIGS. 5 through 7, there is shown a first preferred embodiment of the ball joint of the present invention generally indicated at 9. The ball joint 9 includes a coupling ball 11 of a metal having a stem portion 11' which is secured to the crank arm 3 of the windshield wiper apparatus. The ball joint 9 also includes a socket 10 of a plastic material such as polyacetal. The socket 10 has a substantially spherical convex top surfaces and a spherical concave recess or inner surface 12 in which the coupling ball 11 is snugly but rotatably received.

The recess 12 has an opening defined by an annular edge 13 of the wall of the recess in which circumferentially spaced notches 14 are formed, as best seen in FIG. 6B, to facilitate the insertion of the coupling ball 11 into the recess 12. More specifically, the opening of the recess 12 has its diameter represented by $e1$ while the ball 11 has its largest outer diameter $e2$ which is larger than the diameter $e1$. The ball 11 is adapted to be forced against the annular peripheral edge 13 of the recess 12 to expand or spread apart the edge 13 by virtue of the notches 14 formed therein. Strictly stating, the notches 14 divide the annular edge 13 into a plurality of circumferentially spaced segments which are integral with the body of the socket 10.

The socket 10 is provided with a plurality of integral upper arms 15 extending substantially downwardly and slightly radially outwardly from an upper portion of the body of the socket 10. The arms 15 are advantageously equidistantly spaced in circumferential direction as will be seen in FIGS. 6A and 6B and are spaced from the wall of the recess 12 to cooperate therewith to define circumferentially discontinuous gaps 15' as will be seen in FIGS. 5 and 6B so that the arms 15 are radially inwardly resiliently flexible or deformable when pressures are exerted on the arms 15 in directions indicated by arrows B and B' in FIG. 5. Each of the arms 15 has a downwardly and radially outwardly directed inclined upper surface 16' and a vertically extending lower surface 16 which preferably is a segment of a circle and which is radially inwardly offset from the radially outermost end of the inclined upper surface 16' to provide therebetween a substantially horizontal shoulder as will be seen in FIG. 5.

As shown in FIGS. 5 and 6B, the socket 10 also has a plurality of integral, circumferentially spaced lower support arms 17 each extending radially outwardly from one of the segments of the annular peripheral edge 13 beyond the radially outermost end of the upper inclined surface 16' of each upper arm 15. Each of the lower support arms 17 is preferably disposed between each adjacent pair of upper arms 15 and has a free end upwardly turned substantially at right angles to provide a seat 18 bearing against the bottom surface of the link member 4 on which the socket 10 is mounted, as shown in FIG. 5. The socket 10 is sized and dimensioned such that the distance $e3$ between the seats 18 of each pair of diametrically opposed lower support arms 17 is slightly larger than the width $e4$ of the link member 4, as shown in FIG. 6A, for the purpose to be made apparent later. In addition, the distance $e6$ between the radially outermost ends of each pair of diametrically opposed upper arms 15 is larger than the inner diameter $e5$ of the opening 19 in the link member 4 in which the socket 10 is received. Moreover, the socket 10 and the opening 19 in the link member 4 are arranged such that, when the socket 10 is mounted in position on the link member 4, the opening of the recess 12 defined by the segments of the peripheral edge 13 is limited by the inner surfaces of the upper arms 15 so as not to be expanded or spread apart to an xtent that the inner diameter $e1$ is larger than the diameter $e2$ of the ball 11. Furthermore, the vertical distance between the upwardly facing seat 18 of each of the lower support arms 17 and the downwardly facing horizontal shoulder on an adjacent upper arm 15 when the arms 17 and 15 are in their free states is slightly less than the thickness of the link member 4 for a purpose to be made apparent later.

The afore-described ball joint 9 may be built up in the following manner. First, the coupling ball 11 will be forced against the substantially annular peripheral edge 13 of the opening of the recess 12 of the socket 10 to spread apart the segments of the peripheral edge 13 outwardly by virtue of the notches 14 formed therein until the inner diameter $e1$ is increased to an extent that the ball 11 of the diameter $e2$ can be passed through the opening 13 into abutment contact with the spherical concave surface of the recess 12 to form a ball and socket assembly.

Then, the assembly is located with respect to the link member 4 in a position illustrated by broken lines in FIG. 5 wherein the upper part of the socket 10 is loosely received in the opening 19 in the link member 4. In this position of the assembly relative to the link member 4, the lower support arms 17 of the socket 10 may be oriented optionally with respect to the length of the link member 4 for the reason to be described later. The link member 4 may then be forced in a direction indicated by an arrow A in FIG. 5 toward the lower support arms 17 to radially inwardly deform the upper arms 15 on the socket 10 by caming action between the inclined upper surfaces of the upper arms 15 and the peripheral lower edge of the opening 19 in the link member 4. When the link member 4 is further moved down past the horizontal shoulders between the inclined upper surfaces 16' and the vertical lower surfaces 16 of the upper arms 15 against the resiliency of the lower support arms 17, the upper arms 15 will spring radially outwardly to a position in which the lower vertical surfaces 16 of the upper arms are in pressure contact with the peripheral inner surface of the opening 19 in the link member 4. It will also be appreciated that, in this position of the link member 4 with respect to the ball and socket assembly, the top and bottom surfaces of the link member 4 adjacent the peripheral edge of the opening 19 therein are in pressure contact with the shoulders on the upper arms 15 and the seats 18 on the lower support arms 17 and, thus, are sandwiched therebetween. It will be also understood that, in this position of the socket 10, since the expansion of the inner diameter $e1$ of the peripheral edge 13 of the recess 12 is restrained to be less than the dimension $e2$ by the inner surface of the upper arms 15 of the socket, the ball 11 is prevented from being dis-engaged from the recess 12 through the opening thereof.

When a force is exerted so as to rotate the ball 11 and socket 10 with respect to one another, there will occur two cases of relative rotation, in one of which the socket 10 is stationary with respect to the link member 4 and the ball 11 is rotated relative to the socket 10. In the other case, the ball 11 and the socket 10 are fixedly secured together and the socket 10 is rotated relative to the link member 4. Which case takes place depends upon the difference between the friction between the ball and the socket and the friction between the latter and the link member 4. The latter case of relative rotation is undesirable for the reason that the portions of the upper arms 15 of the socket 10 in sliding contact with the peripheral edge of the opening 19 in the link member 4 will become worn and damaged thereby after operation for a shorter period of time. This is particularly important because the opening 19 is usually formed by punching out the material of the link member 4 and it is difficult to accurately work the peripheral inner surface and the upper and lower edges of the opening 19.

With the ball joint 9 according to the present invention, however, since the distance $e3$ between seats 18 of each pair of diametrically opposed lower supporting arms 17 is designed to be slightly larger than the width $e4$ of the link member 4 and since the seats 18 are in pressure contact with the bottom surface of the link member 4, the socket 10 having its lower support arms 17 optionally oriented with respect to the length of the link member 4 will be allowed to rotate within a limited angle with respect to the link member 4 until some of the lower support arms 17 of the socket 10 are brought into locking engagement at their upturned free end portions with the side edges of the link member 4, as best seen in FIG. 7, to hold the socket 10 against relative rotation with respect to the link member 4.

Reference will then be made to FIGS. 8 to 10 which show a second embodiment of the ball joint of the invention generally indicated at 9a. The ball joint 9a includes a socket 10a and a coupling ball 11a having a construction similar to that of the coupling ball 11 of the preceding embodiment. Thus, the ball 11a has a stem portion 11a' secured to a member 3a such as a crank arm or the like. The socket 10a is somewhat modified as compared with the socket 10 of the preceding embodiment but may be made from a material similar to that from which the socket 10 is made.

The socket 10a is provided with a spherical concave recess or inner surface 12a in which the coupling ball 11a is adapted to be snugly but rotatably received. The spherical recess 12a has its opening defined by a substantially annular edge 13a of the recess 12a. The edge 13a is formed therein with a plurality of circumferentially spaced notches 14a as in the case of the notches 14 formed in the socket 10 of the preceding embodiment.

The socket 10a is designed to be mounted on a link member 4a which is formed therein with an opening 19a defined by a radially inwardly and downwardly tapered inner surface of an annular flange 20 formed on the link member 4a by punching the material of the link member. The socket 10a is adapted to be fitted at the lower peripheral wall portion into the opening 19a. For this purpose, the lower peripheral wall portion of the socket is tapered radially inwardly andd downwardly. Preferably, the degree of the taper on the socket 10a when it is not fitted into the opening 19a is less than the degree of the taper on the flange 20 for the reason to be made apparent later.

The socket 10a is provided with a pair of diametrically opposed arms 15a extending radially outwardly from the body of the socket 10a. Each of the arms 15a has its free end 17a turned downwardly substantially at right angles with respect to the arm. The downwardly turned end 17a is formed thereon with a radially outward projection having a substantially horizontal upper surface or shoulder 18a. The ends 17a of the arms 15a are adapted to be passed through apertures 22 formed in the material of the link member 4a so that the shoulders 18a engage with the bottom surface of the link member 4a adjacent the peripheral edges of the apertures 22 to secure the socket 10a to the link member 4a so as not to allow the socket 10a to be rotated relative to the link member. The apertures 22 are preferably aligned in longitudinal direction of the link member 4a. The socket 10a is advantageously so arranged with respect to the link member 4a that, when the socket is mounted in position on the link member 4a, the segments of the annular edge 13a of the socket is advantageously slightly resiliently deformed or displaced radially inwardly by the peripheral inner surface of the flange 20 to such an extent as to present an inner diameter $e1$ less than the diameter $e2$ of the ball 11a and, at the same time, the shoulders 18a on the arms 15a are upwardly urged into pressure contact with the bottom surface of the link member 4a adjacent the peripheral edges of the apertures 22 in the link member, as shown in FIG. 8, by the resiliency of the arms 15a which advantageously are designed to extend substantially at right angles with respect to the axis of the socket 10a when in its free state, as will be seen in FIG. 10.

The ball joint 9a may be assembled in the following manner. The coupling ball 11a secured to the crank arm 3a may be moved toward the bottom face of the link member 4a and will be passed through the opening 19a until the upper surface of the crank arm 3a is brought into abutment contact with the peripheral bottom edge of the flange 20 on the crank arm 3a. The latter and the link member 4a are maintained in this position while the socket 10a is forcibly moved downwardly to urge the peripheral edge 13a of the recess 12a of the socket 10a against the spherical top surface of the ball 11a so that the segments of the peripheral edge 13a are spread radially outwardly by virtue of the notches 14a formed therein until the diameter $e1$ of the opening of the recess 12a exceeds the diameter $e2$ of the ball 11a to allow the same to be moved past the edge 13 into engagement with the recess 12a. Then, the socket 10a may be rotated, if necessary, with respect to the link member 4a to bring the downwardly turned ends 17a of the arms 15a of the socket 10a into registration with the apertures 22 formed in the link member 4a. The top of the socket 10a will be further pressed downwardly to force the peripheral lower wall portion of the socket 10a into the opening 19a, as shown in FIG. 10. Simultaneously, a downward force will be applied in a direction indicated by an arrow $a$ in FIG. 10 to resiliently deform or displace the arms 15a of the socket in radially inward directions as indicated by arrows $b$ and $b'$ in FIG. 10 by virtue of the caming action between the peripheral edges of the apertures 22 in the link member 4a and the radially inwardly and downwardly inclined undersurfaces of the arm ends 17a, respectively, until the shoulders 18a on the arm ends 17a are moved past the bottom surface of the link member 4a. Simultaneously, the arm ends 17a are moved radially outwardly of the socket 10a by the resiliency of the arms 15a to bring the shoulders 18a into locking engagement with the bottom surface of the link member 4a adjacent the peripheral edges of the apertures 22 therein. The assemblying operation is thus completed.

As an alternative way to build up the ball joint 9a, the socket 10a may first be engaged at its downwardly turned ends 17a on the arms 15a with the peripheral edges of the apertures 22 in the link member 4a. Then the ball 11a may be passed through the opening 19a in the link member 4a and urged against the peripheral edge 13a of the recess 12a of the socket to remove the lower peripheral wall portion of the socket upwardly with respect to the flange 20 on the link member 4a until the segments of the peripheral edge 13a of the recess 12a are spread outwardly by the spherical top surface of the ball 11a sufficiently to allow the ball to be passed past the peripheral edge 13a into engagement with the recess 12a. The upward force on the ball may then be removed to allow the socket to be pressed by the resiliency of its arms 15a down into engagement at the lower peripheral wall portion with the peripheral inner surface of the flange 20 on the link member 4a.

The resiliency of the arms 15a advantageously functions to hold the socket 10a and the ball 11a in an assembled position, as shown in FIG. 8, in which the segments of the peripheral edge 13a are radially supported or backed up by the peripheral inner surface of the flange 20 on the link member 4a so that the annular edge 13a is restrained from being expanded beyond a diameter equal to the diameter $e2$ of the ball 11a. Thus, it will be appreciated that the ball 11a can be held in rotatable engagement with the socket 10a.

So as to dismount the ball and socket assembly from the link member 4a, the downwardly turned ends 17a of the arms 15a of the socket 10a may be pressed radially inwardly, as indicated by the arrows $b$ and $b'$ in FIG. 10, to disengage the shoulders 18a on the ends 17a from the bottom surface of the link member 4a.

The resiliency of the arms 15a immediately moves their ends 17a upwardly with respect to the link member 4a until the shoulders 18a are lifted above the bottom surface of the link member. Then the socket 10a may be manually pulled upwardly to remove the peripheral lower wall portion of the socket from the opening 19a in the link member so that the segments of the peripheral edge 13a of the recess 12a can be spread radially outwardly to allow the ball 11a to be disengaged from the recess 12a.

The preferred embodiments of the ball joint according to the present invention have been described as being used to drivingly connect a crank arm and a link arm of a windshield wiper apparatus. The ball joint of the present invention, however, can also be used to similarly connect a link arm and a link lever of the windshield wiper apparatus. Moreover, it is to be understood that the application of the present invention is not limited to the windshield wiper apparatus and the ball joint according to the invention can be used be operatively connect link members and the like of many other apparatuses.

As described in the above, the present invention provides an advantage in that the lower peripheral wall portion of the socket is radially supported by the inner peripheral surface of the opening in the link member in which the socket is received so that the peripheral edge of the opening of the spherical concave recess in which the ball is received is restrained from being expanded beyond a diameter equal to that of the ball to thereby prevent the ball from being accidentally removed from the recess. The closed top wall of the recess in the socket advantageously seals the ball joint against water and foreign materials such as sand particles. This makes it unnecessary to mount a rubber cover or cap on the ball joint for thereby allowing the ball joint of the invention to be manufactured at a reduced cost as compared with prior art joints which call for such a cover or cap. Moreover, the ball joint design according to the present invention allow the socket to be solely moulded in a mould and does not require a link member, on which the moulded socket is to be mounted, to extend into the mould cavity during moulding operation. This makes it possible to mass-produce a large number of sockets on commercial basis for an economical production of the ball joint according to the invention.

What is claimed is:

1. A ball joint including a coupling ball, a first member on which said ball is mounted, a socket having a body formed therein with a recess which rotatably receives said ball, said socket body including a first peripheral wall portion adjacent the peripheral edge of said recess, said first peripheral wall portion being formed with a plurality of circumferentially spaced notches dividing at least a part of said peripheral wall portion into a plurality of segments, and a second wall portion providing a bottom of said recess, and a second member on which said socket is mounted, wherein said socket is provided with resiliently deformable arms which secure said socket to said second member by virtue of the resilient spring force of said arms acting on said second member, said second member being formed with an opening in which said socket body is received at its portion adjacent the peripheral edge of said recess, wherein said arms comprise a first and second group of arms, each of the arms of said first group being integral with and extending radially outwardly from one of said segments, said second group of arms being integral with and extending from said second wall portion of said body toward said first group of arms, each of said second group of arms having a radially outwardly and obliquely extending inclined outer surface and an inner surface radially outwardly spaced by a gap from the radially outer peripheral surface of said first peripheral wall portion of said socket body, said inner surface being radially inwardly offset from the outermost end of said inclined outer surface to cooperate therewith to define therebetween a shoulder, each of said first group of arms terminating in an end turned toward said second group of arms to cooperate with said shoulder to resiliently grip said second member between said turned end and said shoulder, the arrangement being such that said peripheral edge of said recess is restrained by the peripheral edge of said opening in said second member against expansion beyond a diameter equal to the largest diameter of said ball.

2. A ball joint as defined in claim 1, in which each of said first group of arms is disposed between each adjacent pair of said second group of arms, at least a pair of diametrically opposed arms of said first group being dimensioned such that the distance between their upwardly turned ends is slightly larger than the width of said second member so that said upwardly turned ends are engaged with the side edges of said second member.

3. A ball joint including a coupling ball, a plastic socket having a body formed therein with a recess which rotatably receives said ball, said socket body including a first peripheral wall portion adjacent the peripheral edge of said recess, and a second wall portion providing a bottom of said recess, and a second member on which said socket is mounted, wherein said socket is provided with resiliently deformable arms which secure said socket to said second member by virtue of the resilient spring force of said arms acting on said second member, said second member being formed with an opening in which said socket body is received at its portion adjacent the peripheral edge of said recess and being formed with apertures adjacent said opening in said second member, said arms extending generally radially outward from said socket, each of said arms terminating in a turned end engaged with one of said apertures in said second member to hold said socket against removal therefrom and against rotation of said socket with respect to said second member, the arrangement being such that said peripheral edge of said recess is restrained by the peripheral edge of said opening in said second member against expansion beyond a diameter equal to the largest diameter of said ball.

4. A ball joint as claimed in claim 3, in which the turned end of each of said arms has a substantially flat first surface substantially perpendicular with respect to the axis of said socket and a radially inwardly obliquely extending inclined second surface, said flat first surface being urged by the resiliency of the arm into engagement with one surface of said second member adjacent the peripheral edge of the corresponding aperture therein, said inclined second surface being operative to guide the turned end into the corresponding aperture in said second member when said socket and said second member are assembled together.

5. A ball joint as defined in claim 3, in which said opening in said second member is defined by a tapered inner peripheral surface of an annular flange on said second member, said first peripheral wall portion of said socket body being snugly received in said opening in said second member, said first peripheral wall portion being formed therein with a plurality of notches which divide said first peripheral wall portion into a plurality of circumferentially spaced segments, the free ends of said segments forming a circumferentially discontinuous peripheral edge of said recess, the last-mentioned peripheral edge being

* * * * *